United States Patent [19]

Linthicum et al.

[11] 3,972,211

[45] Aug. 3, 1976

[54] BAR END DROPPER FOR FORGING MACHINES OR THE LIKE

[75] Inventors: James D. Linthicum; Robert E. Wisebaker, both of Tiffin, Ohio

[73] Assignee: National Machinery, Tiffin, Ohio

[22] Filed: Nov. 10, 1975

[21] Appl. No.: 630,285

Related U.S. Application Data

[63] Continuation-in-part of Ser. No. 521,972, Nov. 8, 1974, abandoned.

[52] U.S. Cl. .................................. 72/14; 72/337; 83/80; 83/104; 83/364; 83/369
[51] Int. Cl.[2] ........................................ B26D 7/02
[58] Field of Search ............... 83/80, 81, 104, 111, 83/208, 251, 262, 282, 356.2, 360, 364, 365, 367, 369; 72/14, 15, 337

[56] References Cited
UNITED STATES PATENTS

| | | | |
|---|---|---|---|
| 2,379,682 | 7/1945 | Colucci et al. | 83/365 X |
| 3,264,853 | 8/1966 | Huber | 72/337 X |
| 3,289,508 | 12/1966 | Sollanek | 83/80 |
| 3,523,392 | 8/1970 | Carl | 83/208 X |
| 3,559,446 | 2/1971 | Dom et al. | 72/337 |

Primary Examiner—Othell M. Simpson
Assistant Examiner—Fred A. Silverberg
Attorney, Agent, or Firm—McNenny, Pearne, Gordon, Gail, Dickinson & Schiller

[57] ABSTRACT

A control system is disclosed for a hot forging machine which is supplied with lengths of stock. The system provides automatic rejection of workpieces cut from the rearward end of one length of stock and the forward end of a subsequent length of stock. The system includes a sensor which laterally deflects the rearward end of a length of stock as such rearward end approaches a control point to produce a signal to reset the system. As the forward end of the subsequent length of stock passes the control point, a second signal is generated to actuate the stock movement measuring system. Stock movement is measured by a measuring roller which engages and is turned by the stock as it moves toward the cutter. The rotation of the measuring roller drives a pulse generator which supplies a signal to a counter. When a first predetermined number of pulses have been generated following the movement of the forward end of a length of stock past the control point, it is known that a first predetermined length has passed and rejection of workpieces is established. When a second predetermined number of pulses have been counted to indicate passage of a second predetermined length, the normal cutter operation is re-established to terminate rejection of workpieces.

23 Claims, 3 Drawing Figures

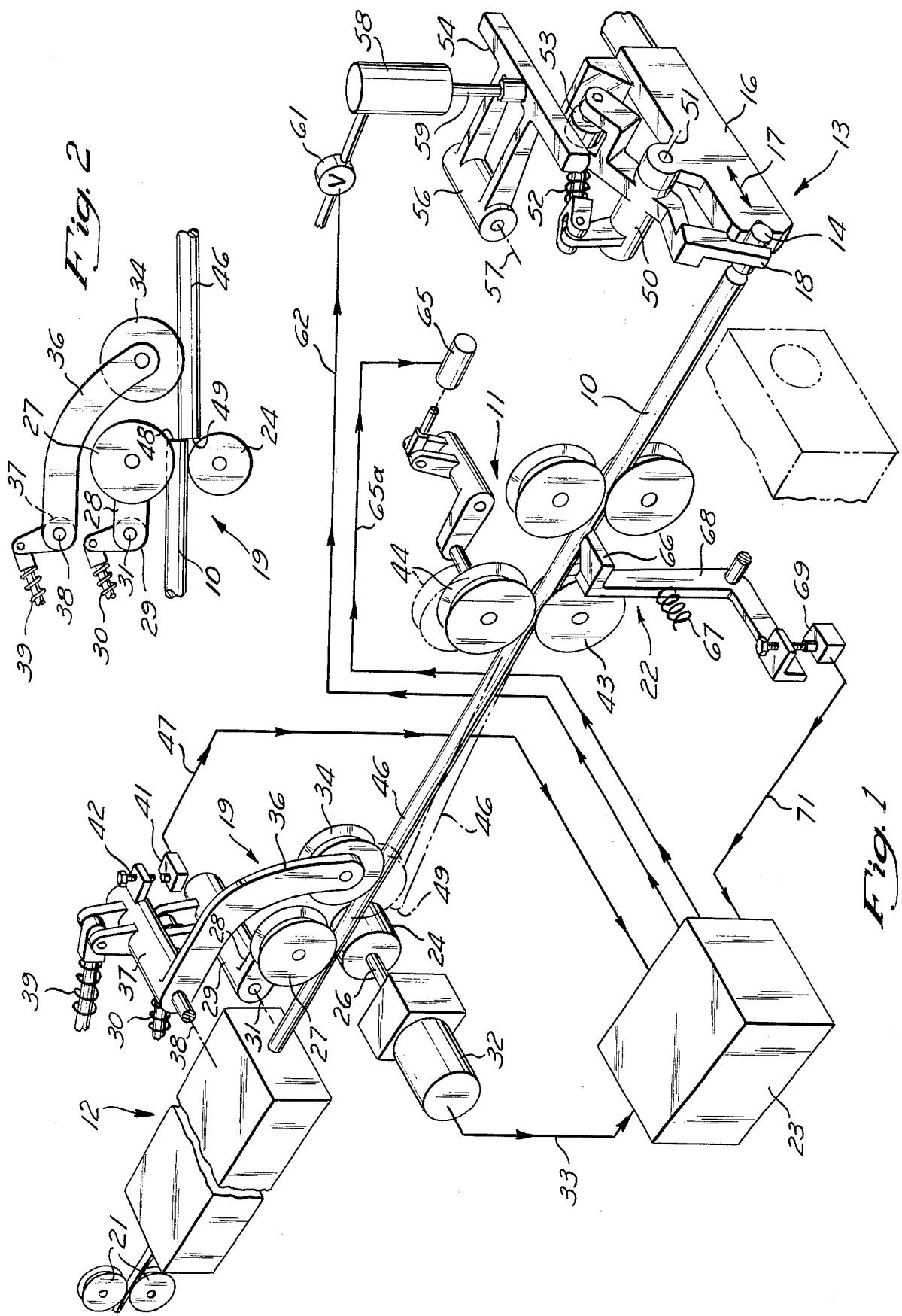

BAR END DROPPER FOR FORGING MACHINES OR THE LIKE

BACKGROUND OF THE INVENTION

This is a continuation-in-part of our copending application Ser. No. 521,972 filed Nov. 8, 1974 now abandoned.

This invention relates generally to automatic machine tools which are supplied with elongated stock such as, for example, automatic forging machines or the like, and more particularly to a novel and improved control system for such machines.

PRIOR ART

Various machines are supplied with elongated stock which the machine cuts into blanks or workpieces and which are processed by the machine. Examples of such machines include hot forging machines supplied with heated wire stock, cold formers, automatic screw machines, and punch presses. In such machines difficulty may be encountered if special provisions are not made to eject or reject the last portion of one length of stock and the first portion of the following length of stock.

For example, in a forging machine, blanks of predetermined length are cut from the long length of wire or rod stock and are automatically transferred to working stations at which tools and dies forge the blank to the required shape. If a blank is not of the proper size, the transfer or forging operation cannot be properly performed and machine damage can result.

Generally it has been a practice of the machine operator to manually eject the last few blanks cut from one length of stock and also the first few blanks cut from the following length of stock. This requires careful attention by the operator and if improperly performed results in either excessive waste or, in some instances, machine damage.

The U.S. Letters Pat. No. 3,289,508 dated Dec. 6, 1966, describes a control system intended to automate the rejection of the blanks cut from the ends of length of stock. In such system, means are provided to sense the passage at the ends of the sections of stock past a control point. Passage of the ends institutes the operation of a counter which counts the number of cutter operations. In accordance with such patent, the counter modifies the operation of a gripper to reject blanks after a first predetermined number of cutter operations and to reactivate the gripper to terminate the rejection of blanks after a second predetermined number of cutter operations. The number of cutter operations which occurs before blank rejection and during blank rejection is selected to insure that the blanks cut from the ends of the lengths of stock are rejected. Such system requires that the operation of a control be changed when the length of the blank is changed.

SUMMARY OF THE INVENTION

There are a number of aspects to the present invention. In accordance with one important aspect of this invention, an improved sensing system is provided. In this system a lateral load is applied to the stock and the stock is supported so that an end of a length of stock is laterally deflected as it approaches a control point. Such lateral deflection is mechanically sensed to produce one control signal. The adjacent end of an adjacent length of stock is supported so that it does not materially deflect under the lateral load. Therefore, the passage of such adjacent end is again mechanically sensed to provide another control signal.

In accordance with this aspect of this invention, a dependable mechanical system is provided which is not subject to damage even in an environment of heat, scale, or other contaminants. Further it does not depend on optical mechanisms which require gaps between adjacent ends or radiation sensors to sense stock temperature.

In accordance with another aspect of this invention, stock movement is directly measured. Therefore the system does not have to be readjusted each time the blank length is changed.

In the illustrated embodiment of this invention, a control system is provided for a forging machine in which a sensor determines the movement of the forward end of a length of stock past a control point or location. Such passage commences the operation of a movement measuring mechanism which measures the length of stock which passes the control point after the passage of the forward end. The measuring mechanism operates to cause rejection of blanks after a first predetermined length of stock passes control point and to terminate rejection after a second predetermined length has passed the control point. The two predetermined lengths are selected to insure the rejection of blanks as the forward end of the length of stock approaches the cutter and to continue rejections until the forward end of the length has reached the cutter and at least one blank is cut therefrom.

In the illustrated system, the spacing between the sensor and the cutter is known and remains unchanged. Further, the length of the stock movement before instituting rejection and during rejection of the blanks remains constant. Consequently, it is not necessary to readjust the control system each time the length of the blank being cut from the stock is changed. In fact in most instances, the control once properly set need not be changed regardless of the changes in the production of the machine.

In the illustrated embodiment, the sensing of the passage of the forward end of a length of stock is accomplished by providing a roller which engages the stock and applies a lateral load thereto. Stock is supported on both sides of the roller excepting when the ends of the stock pass. The roller operates to deflect the rearward end of a length of stock and such deflection is sensed to reset the measuring mechanismm. When the roller is moved back to its initial position by the passage of the forward end of the following length of stock, the measuring mechanism is energized to measure the length of stock which passes the control point or sensor after the passage of the forward end thereof.

The mechanism illustrated for measuring the movement of stock includes a roller which engages one side of the stock and is turned by the movement of the stock. Such roller drives a pulse generator which generates a number of pulses which is a direct function of the amount of rotation of the roller and in turn the amount of movement of stock past the roller. A control system determines the number of pulses which occur after the passage of the forward end of a length of stock and is connected to operate a gripper release mechanism to cause rejection of blanks after the first predetermined length is moved past the control point. As the stock continues to feed toward the cutter, the rejection is continued until a second predetermined length has passed the control point as determined by the number of pulses generated by the pulse generator. When the second predetermined length of stock has passed the control point, the normal operation of the gripper is resumed.

In some instances, a subsequent length of stock does not immediately follow a preceding length. The illustrated embodiment of the present invention provides a second sensing mechanism located at a second control point between the first control point and the cutter. This sensor determines the passage of the rearward end of one length of stock and the absence of a following length of stock. When the second sensor determines that the rearward end of one length of stock passes without the presence of a following length of stock, it actuates the rejection of blanks and the blank rejection continues until a subsequent length of stock is properly positioned for continued machine operation.

BRIEF DESCRIPTION OF THE DRAWINGS

FIG. 1 is a schematic perspective view of the principal functional portions of a machine incorporating this invention with various parts broken away or removed for purposes of clarity;

FIG. 2 is a fragmentary side elevation of the mechanical sensing mechanism illustrated after the rearward end of a length of stock has deflected and before the forward end of a subsequent length of stock has passed the control point.

DETAILED DESCRIPTION OF THE DRAWINGS

Figure 3:
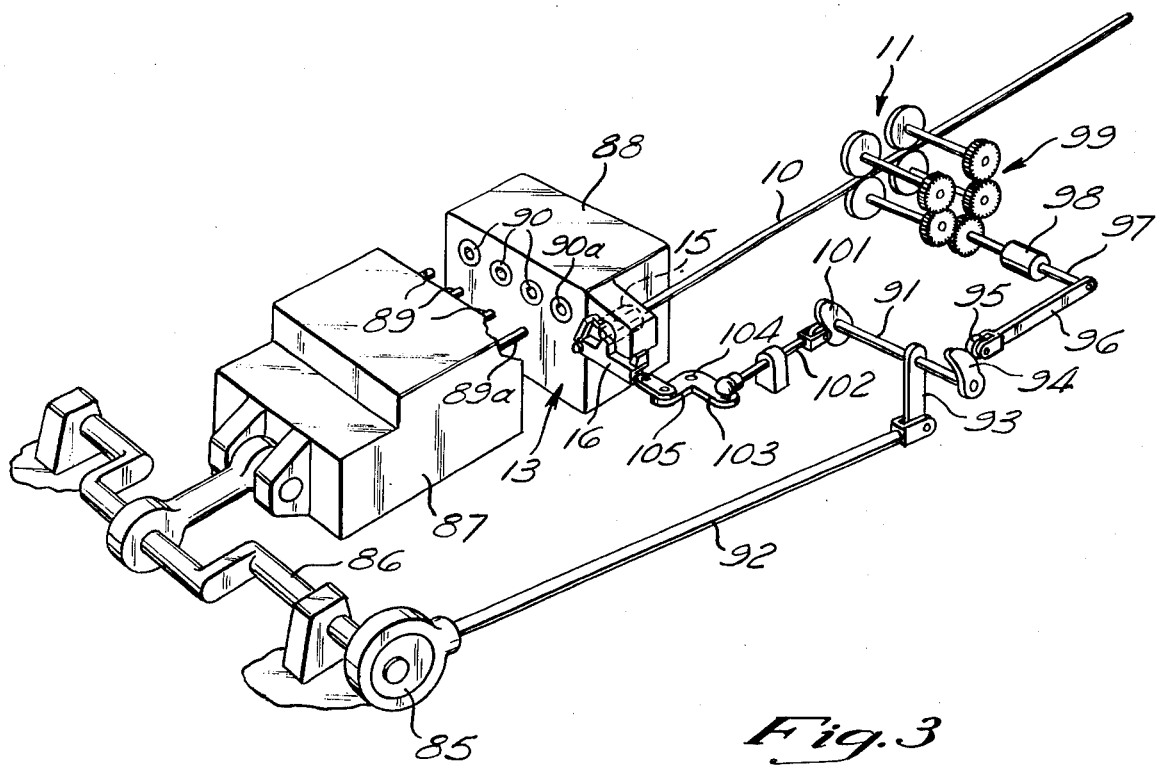
FIG. 3 is a schematic perspective view of a forging machine incorporating the control system of FIGS. 1 and 2.

The present invention is particularly suitable for use in hot forging machines in which long lengths of stock are fed to the machine through a heater mechanism which heats the stock as it moves to the forging machines. Reference should be made to the U.S. Letters Pat. No. 3,829,367 dated June 28, 1974, which illustrates a feed system for a hot forging machine of the type involved in the illustrated embodiment of this invention. The disclosure of such patent is incorporated by reference.

It should be understood, however, that the illustrated embodiment is merely one example of a preferred use of the present invention and that the invention is also applicable to other types of machines, such as cold formers and automatic screw machines or the like.

Referring to the drawings, elongated lengths of stock 10 are pulled by powered feed rolls 11 through a heater 12, (illustrated in FIG. 1) and are fed to a cutter mechanism 13 which operates to cut blanks or workpieces 14 of uniform length from the forward end of the stock 10. The cutter mechanism includes a stationary quill 15 through which the stock extends and a cutter member 16 which reciprocates back and forth in the direction of the arrow 17 along the face of the quill 15 between retracted and extended positions. In the retracted position, the stock is fed forward against a stock gauge (not illustrated) by the feed rolls 11 which intermittently operate in a manner timed with the operation of the cutter member 16.

In a forging machine, the feed rolls and cutter are usually powered by the machine drive which also powers the main forming slide of the machine. Various linkages and mechanisms may be used for the drive. For example, the Friedman Pat. No. 2,613,776 discloses a linkage system and clutch for powering feed rolls from the crank shaft or pin of the cold header. Similarly, the Friedman Pat. No. 3,542,864 discloses a linkage system for powering a reciprocating cutter, a transfer and a knockout mechanism from the main crank of the machine for making nuts. Both of these patents are incorporated by reference. Since the cutter and feed rolls are usually mechanically powered by the same power source, they are operated in timed relationship to each other.

FIG. 3 schematically illustrates one mechanism which may be used to power the feed rolls 11 and cutter 13. It should be recognized, however, that other such mechanisms, including the ones illustrated in the patents referenced immediately above, may be utilized in a particular machine incorporating the present invention.

Referring to FIG. 3, the mechanism includes an eccentric 85 mounted on the main crank 86 of the machine. The crank 86 is connected to drive the reciprocating forming slide 87 toward and away from a die breast 88. Tools 89 carrier by the slide 87 progressively form blanks positioned at the dies 90 in the die breast 88. A transfer (not illustrated) operates to progressively move the blanks from one die to the next die so that the blank is progressively formed to the desired shape.

The eccentric 85 is connected to oscillate a cam shaft 91 by a rod 92 which is journalled on the eccentric at one end and is connected at the other end to an arm 93 projecting from the cam shaft 91. Consequently, the cam shaft oscillates back and forth in timed relationship to the rotation of the crank 86 and in timed relationship to the reciprocation of the forming slide 87.

Mounted on the cam shaft 91 is a first cam 94 which engages a follower 95 on an arm 96. The arm 96 is mounted on a shaft 97 which powers the feed rolls through a one-way clutch 98 and a gear train 99. The clutch 98 engages and drives the feed rolls when the shaft 97 turns in one direction and disconnects to allow the shaft to turn in the other direction back to its initial position without driving the feed rolls. Consequently, the feed rolls are driven in an intermittent manner to feed the stock 10 toward the cutter 13.

Preferably the cutter is also powered by the same cam shaft 91. One linkage is illustrated for such drive. Such linkage includes a cam 101 mounted on the cam shaft 91, which reciprocates a follower rod 102 and in turn oscillates a crank 103. The crank is journalled on a vertical pivot 104 and is provided with an arm 105 which is connected to reciprocate the cutter member 16. Here again, the cutter member 16 operates in timed relation to the operation of the crank shaft 86 so it is also timed with the operation of the feed rolls 11 and the forming slide.

After the stock is positioned against the stock gauge, the cutter member 16 extends to shear or cut a workpiece from the main length of stock, and carries the workpiece to a position where it is subsequently worked or transferred. A releasable gripper 18 normally engages the workpiece 14 and cooperates with the cutter member to hold the workpiece as it is transferred by the extension of the cutter member to the subsequent work location.

During normal operation, the workpiece or blank 14 is carried by the cutter member 16 and the gripper 18 to a position in which the blank is aligned with a first die 90a. As the associated tool 89a moves toward the die 90a it engages the workpiece and pushes it into the die where the first forming operation takes place.

A release or reject mechanism which is described in detail below operates to deactivate the gripper so that a workpiece 14 is not gripped in position against the cutter member 16 as the cutter member 16 extends. When the release or reject mechanism is actuated the workpiece is dropped and rejected.

Positioned between the feed rolls 11 and the heater 12 is a sensing and stock movement measuring mechanism 19 which is connected to control the operation of the gripper to cause rejection of workpieces which are cut from the rearward end of one length of stock and from the forward end of the subsequent length of stock to insure that nonuniform workpieces are not transferred to the subsequent machine operations.

In the illustrated embodiment, an auxiliary pair of feed rolls 21 are provided ahead of the heater 12 to feed the forward end of each length of stock through to the principal feed rolls 11, which then function to intermittently feed the stock to the cutter mechanism 13. In addition, an auxiliary sensor 22 is provided to engage the stock between the feed rolls 11 and to sense a condition in which a subsequent length of stock is not directly following a prior length of stock. A control mechanism 23 is connected to the various other mechanisms to control the operation of the gripper 18 when predetermined conditions exist.

The sensing and measuring mechanism 19 includes a support and movement measuring roller 24 mounted on a shaft 26. The roller 24 engages the lower side of the stock 10 and rotates by the movement of the stock. A load roller 27 engages the stock immediately opposite the roller 24 to press the stock into tight engagement with the roller 24. The load roller 27 is journaled on an arm 28 provided by a mounting member 29, which is, in turn, journaled on a shaft for arcuate rotation about a pivot axis 31. A spring 30 biases the mounting member 29 in a clockwise direction as illustrated in the drawings, to resiliently urge the roller 27 toward the roller 24 to insure tight engagement with the stock. Preferably the load roller 27 is formed with a V-shaped periphery; however, the roller 24 is cylindrical in shape so that its movement by the stock 10 is not affected by the diameter of the stock.

Connected to the shaft 26 is a pulsed generator 32 which produces an electrical pulse each time the shaft rotates through a predetermined angle of rotation. In the illustrated embodiment, the pulse generator produces one hundred fifty separate pulses during each revolution of the roller 24. Therefore, a pulse is produced each time the roller 24 rotates through an angle of 2.4°. Further, the roller 24 in the illustrated embodiment is provided with a diameter of 3½ inches. Such roller has a peripheral length slightly less than 11 inches and, when used with a pulse generator which creates 150 pulses per revolution, a pulse is generated each time the bar moves through a distance equal to 0.0733038 inches. With such system in which pulses are generated each time the stock 10 moves through a relatively small distance, accurate measurement of the movement of the stock is obtained. Sufficient loading is provided by the roller 27 to insure that significant slippage does not occur between the stock 10 and the roller 24 during the intermittent movement of the stock.

The output electrical signals from the pulse generator 32 are supplied to the control 23 through the schematically illustrated conductor 33.

A third, or sensing, roller 34 is also provided by the sensing and measuring mechanism 19. This roller is journaled on the free end of an arm 36, provided by a mounting member 37. Here again, the mounting member is journaled on a shaft for rotation about an axis 38. A spring 39 resiliently biases the mounting member 37 in a clockwise direction as illustrated, and in turn presses the roller 34 against the upper side of the stock 10. A sensing switch 41 is operated by an adjustable screw 42 when the roller 34 moves downwardly from the illustrated position.

During the normal feeding of stock 10 the stock is supported by the roller 24 and by the first pair 43 and 44 of feed rolls 11. Therefore, the roller 34 is positioned to indicate the a continuous length of stock is present. However, when the rearward end of one length of stock passes away from the support provided by the roller 24, a relatively long, unsupported cantilever section 46 of stock is provided which is deflected downwardly by the load of the roller 34, as illustrated in FIG. 2 and to an exaggerated degree in phantom in FIG. 1. This allows the roller 34 to pivot downwardly around the axis 38 and establishes that the rearward end of one length of stock has passed the roller 24. The downward movement of the roller 34 operates the switch 41, which in turn is connected to the control mechanism 23 by a conductor schematically illustrated at 47. The amount of deflection is less than a distance equal to the diameter of the stock so that the rearward end of one length of stock is not moved laterally out of engagement with the forward end of the following length of stock, but instead is merely offset, as illustrated in FIG. 2.

The operation of the switch 41 produces a signal which indicates the approach of the rearward end of one length of stock and produces a signal which causes the counter of the control mechanism 23 to reset. The forward end 48 of a subsequent length of stock 10 is fed by the feed rolls 21 along behind the rearward 49 of the preceding length of stock, and is normally maintained in engagement with such rearward end, as illustrated in FIG. 2. As the stock continues to move from the position of FIG. 2, the forward end 48 of the following length of stock moves into engagement with the rollers 34 and raises the roller back to its normal position. Because the roller 34 is close to the roller 24 and the stock is therefore supported closely adjacent to the forward end as it engages the roller 34, the stock does not deflect to any substantial degree. On the other hand, the spacing between the rollers 43 and 44 and the roller 34 is substantially greater and the deflection indicated in FIG. 2 occurs without any substantial lateral force on the stock.

As soon as the roller 34 has come back to its initial position by the movement of the forward end 48 of the following length of stock, the switch 41 returns to its initial condition and produces a signal which is supplied to the control to initiate the counting of the pulses generated by the pulse generator 32.

The operation of the counter and control result in a measurement of the length of the stock that moves past the control point after the passage of the forward end 48 of a particular length of stock. The control mechanism 23 is arranged to count the pulses as the stock movement occurs and to determine by the total number of pulses when a first predetermined length of stock has passed the control point to indicate that the forward end 48 of the following length of stock is approaching the cutter 13. Since the spacing between the cutter mechanism 13 and the sensing and measuring mechanism 19 is constant, it is merely necessaary to set the control mechanism so that it determines when the forward end 48 of the following length of stock reaches a predetermined location spaced from, but approaching, the cutter mechanism 13. When this predetermined count and in turn the predetermined movement of stock has occurred, the control mechanism 23 functions to modify the operation of the cutter to release the grippers 18.

The gripper 18 is provided by a bell crank lever 50 pivoted for rotation about an axis 51 and biased toward its gripping position by a spring 52. A roller 53, journaled on the bell crank lever 50, rolls back and forth along a track member 54. The track member 54 is provided by a pivoted lever 56, which is pivoted for rotation about an axis 57. A piston and cylinder actuator 58 controls the position of the track member 54. In its normal gripping position illustrated, the gripper 18 engages and grips the workpiece 14. However, when release of the gripper 18 is required, the extension of the pistons 59 of the actuator 58 lowers the track member 54 and pivots the gripper away from the cutter member 16 so that it cannot function to grip the workpiece.

When the stock, having a length equal to a first predetermined length, has moved past the control point, the control mechanism 23 operates a valve 61 to cause extension of the piston 59. A conductor schematically illustrated at 62 connects the valve 61 and the control mechanism 23 so that the control mechanism can control the operation of the valve. The valve is maintained in the position to maintain extension of the piston and, in turn, to render the gripper inoperative until a second predetermined length of stock 10 has moved past the control point after the passage of the forward end thereof. Such movement is determined by the counting of the pulses generated by the pulse generator 32. The valve 61 is then operated to cause retraction of the piston 59 to return the gripper to its normal gripping operation. The second predetermined length is greater than the spacing between the cutter mechanism 13 and the sensing and measuring mechanism 19 to insure that the forward end of the stock has passed through the cutter and some few workpieces have been cut from the forward end of the length of stock and rejected. In practice, the first predetermined length of stock is selected so that the last few workpieces cut from one end of stock are rejected along with the first few workpieces cut from the following lengths of stock and then normal machine operation is reestablished.

In order to insure smooth entrance of the forward end 48 of stock into the first pair of feed folls 43 and 44, the control 23 is arranged so that the upper feed roll 44 is moved upward to open the rolls as the forward end 48 of the length of stock approaches such pair of feed rolls. This opening of the feed rolls is accomplished by a schematically illustrated actuator 65. After the forward end has passed between the first pair of feed rolls 43 and 44, but before it enters the second pair of feed rolls, the roll 44 is again closed against the stock.

Here again, the spacing between the first pair of feed rolls 43 and 44 and the sensing and measuring mechanism 19 is known. Therefore, after a predetermined number of pulses have been generated following the passage of the forward end of the stock, it is known that the forward end 48 is approaching the first pair of feed rolls 43 and 44. A signal supplied by the control mechanism 23 through conductors schematically illustrated at 65a operates the actuator 65 and causes the upper feed roll 44 to move up opening the rolls. Again, the measurement of the movement of the stock determines the point at which the forward end 48 has passed in between the two rolls 43 and 44 so the control mechanism returns the upper roll 44 to its normal tight gripping position against the stock. By providing the system wherein the first pair of feed rolls are opened to allow passage of the forward end of the stock and are then gripped, it is insured that the forces of feeding the forward end of the stock by the auxiliary rolls 21 do not become excessive. This eliminates the tendency to bend or buckle the stock. Once the feed rolls 43 and 44 grip the forward end of the stock, of course, the stock is pulled rather than pushed and the bending or buckling of the stock is not a problem.

In some instances, a subsequent length will not immediately follow a preceding length of stock. The auxiliary sensor 22 determines when this occurs. If the rearward end 49 of the given length of stock moves past a block 66 without being immediately followed by the forward end of the following length of stock, a spring 67 causes a lever 68 on which the sensor block 66 is mounted to rotate in a clockwise direction, as viewed in FIG. 1. Such movement operates a switch 69, which is connected by a conductor schematically illustrated at 71 to the control mechanism. Whenever the switch 69 operates to indicate the absence of stock, the control mechanism 23 causes the gripper 18 to be released to cause rejection of workpieces cut thereafter from the stock. The control mechanism 23 is arranged so that rejection continues until a subsequent length of stock is fed into the machine and has moved past the sensor and measuring mechanism 19 to the second predetermined distance to insure that the remaining section of the preceding length of stock is cut and rejected and a first few pieces are cut from the forward end of the following length of stock.

In some installations, the action of the cutter operates to cam the stock backward a small distance during the cutting action, or causes the stock to spring back a small amount during the cutting impact. Therefore, the pulse generator 32 is selected to provide plus signal pulses during rotation in one direction and negative signal pulses during rotation in the other direction. Also, the control 23 is selected to subtract pulses resulting from the backward stock movement from the pulses resulting from the forward stock movement to produce the algebraic total of the pulses to accurately represent the total movement of the stock. With such a control, there is no error developed, even in systems in which rearward stock movement occurs.

To summarize the operation of the ilustrated embodiment of this invention is as follows. A length of stock is fed by the feed rolls 11 intermittently to a cutter mechanism 13 which operates to cut workpieces 14 from the end of the stock and to transfer such workpieces to subsequent machine operating locations. As soon as the rearward end 49 of a given length of stock 10 passes a measuring roller 24, the passage is sensed by the movement of a sensing roller 34 to the position of FIG. 2. This causes the control mechanism 23 to reset so that it can commence counting the pulses generated by the pulse generator 23, as soon as the sensing roller 34 is moved back to its initial position by the engagement therewith with the forward end 48 of a subsequent length of stock. Normally, the following or subsequent length of stock is maintained in engagement with the rearward end of the preceding length of stock by the feed rollers 21. When the control mechanism 23 determines that a sufficient length of stock has moved past the control point to indicate the approach of the forward end 48 of the subsequent length of stock to the cutter, the control mechanism operates to release the gripper 18 allowing rejection of any workpieces cut from the length of stock. The rejection continues until a few workpieces are cut from the leading edge of the subsequent length of stock. When the movement of the subsequent length of stock has progressed to a degree to insure that a few workpieces have been cut from the forward end thereof, the normal operation of the gripper 18 is re-established.

The control mechanism also functions to open the first pair of feed rolls 43 and 44 as the forward end of a subsequent length of stock approaches them to insure easy entry of such forward ends. As soon as the forward end has passed between these two feed rolls, they are returned to their normal gripping position on the stock.

In the event that a subsequent length of stock does not immediately follow a preceding length, an auxiliary sensor determines this fact and terminates operation of the gripper until a subsequent length of stock is fed through to the cutter.

Although a preferred embodiment of this invention is illustrated, it should be understood that various modifications and rearrangements of parts may be resorted to without departing from the scope of the invention disclosed and claimed herein.

What is claimed is:

1. A machine for performing operations on elongated lengths of stock comprising operator means at an operating location normally operable to perform repeated operations on said stock as said stock moves to said operating location, feed means to feed stock to said operating location, and sensing means at a control point operable to determine the movement of one end of a length of stock past said control point and to modify the operation of said operator means as said one end approaches and passes said operating location, said sensing means providing support operable to normally maintain said stock in one position and to allow lateral movement thereof to another position when an end portion passes said control point, and a sensor member engaging said stock and being maintained in a first position when said stock is in said one position and moving to a second position when said stock moves to said another position, said sensing means generating a signal when said sensor member moves between said first and second positions.

2. A machine as set forth in claim 1 wherein said sensor member is urged against said stock with sufficient force to laterally deflect said stock to said another position when an end portion thereof passes said control point.

3. A machine as set forth in claim 2 wherein the lateral movement of stock to said another position is through a distance less than the thickness of said stock.

4. A machine as set forth in claim 3 wherein said sensing means provides two spaced supports, and said sensor member is adjacent to one support and spaced from the other support, said force of said sensor member on said stock being sufficient to deflect stock supported only by said other support but insufficient to materially deflect stock supported by said one support.

5. A machine as set forth in claim 4 wherein said sensing means generates one signal when the rearward end portion of one length of stock approaches said control point and generates another signal when the forward end of a subsequent length of stock moves to said control point.

6. A machine as set forth in claim 5 wherein measuring means are provided which are actuated by said sensing means when said forward end of said subsequent length of stock moves to said control point, said measuring means measuring the length of stock moving past said control point and operating to modify the operation of said operator means when a first predetermined length of stock moves past said control point which is less than the spacing between said control point and said operating location and operating to restore normal operation of said operating means when a second predetermined length of stock moves past said control point which is greater than the spacing between said control point and said operating location.

7. A machine as set forth in claim 6 wherein said measuring means includes a roller engaging said stock and being driven thereby, said roller also providing said one support.

8. A machine as set forth in claim 7 wherein said one signal resets said measuring means, and said other signal actuates said measuring means.

9. A machine as set forth in claim 8 wherein said feed means includes an opposed pair of feed rolls located between said control point and said operating location, and said measuring means open said feed rolls as the forward end of a subsequent length of stock moves between said feed rolls.

10. A machine as set forth in claim 9 wherein said feed rolls provide said other support.

11. A machine as set forth in claim 10 wherein said operator means is a cutter operable to cut pieces of stock from said lengths of stock.

12. A machine as set forth in claim 4 wherein said operating means is a cutter operable to cut pieces of stock from said lengths of stock and includes gripping means to grip said pieces of stock, said gripping means being rendered inoperative as ends of said lengths of stock move into said cutter.

13. A machine for performing operations on elongated lengths of stock comprising operator means at an operating location normally operable to perform repeated operations on said stock as said stock moves to said operating location, feed means operable to feed lengths of stock to said operating location, and sensing and measuring means operable to sense the movement of the end of a length of stock past a control point and to measure the length of stock which moves past said control point after the passage of said end, said sensing and measuring means being connected to modify the operation of said operator means when the length of stock passing said control point after said end is equal to a first length less than the spacing between said control point and operating location and to reestablish normal operation of said operating means after the length of stock passing said control point after passage of said end is equal to a second predetermined length greater than the spacing between said control point and said operating location.

14. A machine as set forth in claim 13 wherein said sensor and measuring means includes a roller engaging said stock and being driven by movement thereof.

15. A machine as set forth in claim 14 wherein said operating means is a cutter operable to cut pieces of stock from said lengths of stock and includes gripping means to grip said pieces of stock, said gripping means being rendered inoperative as ends of said lengths of stock move into said cutter.

16. A machine for cutting pieces of stock from an elongated length of stock and for performing operations on said pieces comprising a cutter repeatedly operable to cut pieces of stock from lengths of stock moved to said cutter, clamping means for holding the cut-off pieces of stock, feed means for feeding lengths of stock to said cutter, a sensor at a control point operable to sense the passage of the end of a length of stock, measuring means operable to measure the length of stock moved towards said cutter, said sensor initiating operation of said measuring means when the end of a length of stock passes said control point, said measuring means modifying the operation of said clamping means after is measures the movement of a predetermined length of stock less than the distance between said control point and said cutter and restoring the operation of said clamping means after it measures the movement of a second length of stock having a length greater than the spacing between said control point and said cutter.

17. A machine as set forth in claim 16 wherein said end of a length of stock is the forward end thereof, and auxiliary sensing means are provided at a second control point to determine the absence of a subsequent length of stock and modify the operation of said clamping means.

18. A machine as set forth in claim 17 wherein said stock is heated, said feed means includes a pair of feed rolls between said control point and said cutter, and said measuring means opens said feed rolls as said forward end approaches said feed rolls.

19. A machine as set forth in claim 17 wherein said sensor operates to sense the approach of the rearward end of a preceding length of stock and thereupon resets said measuring means.

20. A machine as set forth in claim 16 wherein said measuring means includes a measuring roller engaging said stock and being operated by the movement thereof.

21. A machine as set forth in claim 20 wherein said measuring roller operates a pulse generator, and counting means are provided to measure the algebraic sum of pulses produced by said generator and thereby determine the length of stock which moves past the measuring roller.

22. A machine as set forth in claim 13 wherein said sensing means includes a member laterally pressed against the side of stock passing said control point, and said stock is supported adjacent to said control point so that the rearward end of a length of stock is deflected laterally upon passage of said control point.

23. A forging machine comprising a die breast, a slide reciprocable toward and away from said die breast, cooperating tools and dies carried by said breast and slide operable to form work pieces, cutter means, stock feed means operable to feed elongated pieces of stock to said cutter in timed relationship to the operation of said slide, said cutter operating in timed relationship to the operation of said slide to cut work pieces from said stock for forming by said tools and dies, and sensing means at a control point operable to determine the movement of an end of a length of stock past said control point and to modify the operation of said cutter to reject work pieces as an end approaches said cutter, said sensing means providing support operable to normally maintain stock in one position and to allow lateral movement thereof to another position when an end portion passes said control point, and a sensor member engaging said stock and being maintained in a first position when the stock is in said one position and moving to a second position when said stock moves to said another position, said sensing means generating a signal when said sensor member moves between said first and second positions.

* * * * *

UNITED STATES PATENT OFFICE
CERTIFICATE OF CORRECTION

Patent No. 3,972,211       Dated August 3, 1976

Inventor(s) James D. Linthicum et al.

It is certified that error appears in the above-identified patent and that said Letters Patent are hereby corrected as shown below:

Column 2, line 49, "mechanismm" should read -- mechanism --.

Column 4, line 23, "carrier" should read -- carried --.

Column 11, line 23, "is" should read -- it --.

Signed and Sealed this

Sixteenth Day of November 1976

[SEAL]

Attest:

RUTH C. MASON
*Attesting Officer*

C. MARSHALL DANN
*Commissioner of Patents and Trademarks*